United States Patent [19]

Fujiwara

[11] Patent Number: 5,229,706
[45] Date of Patent: Jul. 20, 1993

[54] ELECTRONIC EQUIPMENT HAVING AUTOMATIC POWER-OFF FUNCTION

[75] Inventor: Takashi Fujiwara, Okazaki, Japan

[73] Assignee: Brother Kogyo Kabushiki Kaisha, Nagoya, Japan

[21] Appl. No.: 855,559

[22] Filed: Mar. 23, 1992

[30] Foreign Application Priority Data

May 30, 1991 [JP] Japan .................. 3-127485

[51] Int. Cl.$^5$ .................. H02J 7/10; H02J 7/34
[52] U.S. Cl. .................. 320/31; 320/11; 307/66
[58] Field of Search .................. 320/31, 2, 10, 11; 307/66

[56] References Cited

U.S. PATENT DOCUMENTS

| | | | |
|---|---|---|---|
| 4,670,703 | 6/1987 | Williams | 320/22 |
| 4,709,202 | 11/1987 | Koenck et al. | 320/43 |
| 4,737,702 | 4/1988 | Koenck | 320/40 |

Primary Examiner—Steven L. Stephan
Assistant Examiner—Robert Nappi
Attorney, Agent, or Firm—Oliff & Berridge

[57] ABSTRACT

Electronic equipment, such as a word processor or personal computer, is capable of preventing a battery from being overcharged. When no information is entered to the equipment via keys for a specified period of time, such as ten minutes or longer, in a state in which an AC adaptor is electrically connected to an adaptor connecting terminal, a transistor TR1 is turned on to start the charging of the battery. The battery is continuously charged until another period of time, such as six hours, elapses from the time of the initiation of its charging. When six hours have elapsed, the transistor TR1 is turned off to stop the supply of a charging current to the battery. As a result, the battery has been fully charged and a switching device is turned off, whereby the supply of electric power to a control unit and a load is stopped.

24 Claims, 9 Drawing Sheets

| S1 | STORE TIME DATA TS1 INDICATIVE OF TIME WHEN 10 MINUTES HAVE ELAPSED |
|----|---------------------------------------------------------------------|
| S2 | IS INFORMATION ENTERED VIA KEYS ? |
| S3 | EXECUTE PROCESS CORRESPONDING TO INFORMATION ENTERED |
| S4 | INPUT TIME DATA T |
| S5 | $T \geq TS1$ |
| S6 | IS SIGNAL AT IP LOW IN LEVEL ? |
| S7 | STORE TIME DATA TS2 INDICATIVE OF TIME WHEN 6 HOURS HAVE ELAPSED |
| S8 | TURN ON TRANSISTOR TR1 |
| S9 | INPUT TIME DATA T |
| S10 | $T \geq TS2$ |
| S11 | TURN OFF TRANSISTOR TR1 |
| S12 | TURN OFF SWITCHING DEVICE |

FIG. 3B

| S1 | STORE TIME DATA TS1 INDICATIVE OF TIME WHEN 10 MINUTES HAVE ELAPSED |
|---|---|
| S2 | IS INFORMATION ENTERED VIA KEYS ? |
| S3 | EXECUTE PROCESS CORRESPONDING TO INFORMATION ENTERED |
| S4 | INPUT TIME DATA T |
| S5 | $T \geq TS1$ |
| S6 | IS SIGNAL AT IP LOW IN LEVEL ? |
| S7 | STORE VOLTAGE DATA VFC INDICATIVE OF BATTERY VOLTAGE WHEN BATTERY IS FULLY CHARGED |
| S8 | TURN ON TRANSISTOR TR1 |
| S9 | INPUT VOLTAGE DATA V |
| S10 | $V < VFC$ |
| S11 | TURN OFF TRANSISTOR TR1 |
| S12 | TURN OFF SWITCHING DEVICE |

FIG. 5B

| S1 | STORE TIME DATA TS1 INDICATIVE OF TIME WHEN 10 MINUTES HAVE ELAPSED |
|---|---|
| S2 | IS INFORMATION ENTERED VIA KEYS ? |
| S3 | EXECUTE PROCESS CORRESPONDING TO INFORMATION ENTERED |
| S4 | INPUT TIME DATA T |
| S5 | $T \geq TS1$ |
| S6 | IS SIGNAL AT IP LOW IN LEVEL ? |
| S7 | STORE TEMPERATURE DATA TFC INDICATIVE OF BATTERY TEMPERATURE WHEN FULLY CHARGED |
| S8 | TURN ON TRANSISTOR TR1 |
| S9 | INPUT TEMPERATURE DATA T |
| S10 | $T > TFC$ |
| S11 | TURN OFF TRANSISTOR TR1 |
| S12 | TURN OFF SWITCHING DEVICE |

FIG. 6B

ELECTRONIC EQUIPMENT HAVING AUTOMATIC POWER-OFF FUNCTION

BACKGROUND OF THE INVENTION

Field of the Invention

The present invention relates to electronic equipment, such as a word processor or personal computer, and more specifically to electronic equipment having an automatic power-off function for cutting off electric power when data is not input from a keyboard or the like for a given period of time.

Description of the Related Art

Recent known electronic equipment, such as a word processor or a personal computer, is small in size and driven by a battery. However, typically the battery allows the electronic equipment to be activated only for a short period of time. Therefore, such electronic equipment is provided with an automatic power-off function, i.e., a function for cutting off or stopping the supply of electric power thereto from the battery when no data is entered via a keyboard for a given period of time or longer. In addition, such electronic equipment is constructed so that it can be powered over a long period of time by the battery.

Further, typical electronic equipment includes a converter for converting a voltage from a commercial power source into a predetermined DC voltage for outputting to the equipment. When the electronic equipment is used over a long period of time, the commercial power source is electrically connected to the electronic equipment.

When the commercial power source is electrically connected to the electronic equipment, the battery is charged via a charging circuit by electric power supplied from the commercial power source. However, when the battery is subjected to an overcharged state for a long period of time, it produces heat and deteriorates in performance. Therefore, when a control unit in the electronic equipment determines that a timer has counted the time required to sufficiently store electric charge in the battery from the time of starting of the charging of the battery, the control unit cuts off or stops the supply of charging current fed from the charging circuit to the battery. Thus, the battery is prevented from being continuously subjected to charging which results in the overcharged state.

However, the control unit is deactivated when the supply of the electric power thereto from the battery is stopped. Therefore, the control unit cannot determine whether or not the timer has counted the time required to fully store the electric charge in the battery from the time of starting of the charging of the battery after the automatic power-off function has been activated. Thus, the charging current is not cut off even if the battery is overcharged, thereby causing a problem in that the battery produces heat and deteriorates in performance.

SUMMARY OF THE INVENTION

With the foregoing and other problems in view, it is an object of the present invention to provide electronic equipment capable of, in a simple structure, preventing a battery from being overcharged.

It is another object of the present invention to provide electronic equipment capable of preventing a battery from producing heat resulting in deteriorated performance and of providing longer service life of the battery.

According to one aspect of the present invention, electronic equipment is provided comprising inputting means for inputting data, a battery, and power cutting-off means for electrically processing data input from the inputting means after electric power has been supplied from the battery and for cutting off or stopping the supply of the electric power from the battery when no data is entered via the inputting means for a given period of time. The electronic equipment also comprises charging means for charging the battery with a supply of power from an external power source overcharge preventing means for detecting whether the battery has been overcharged so as to cut off the supply of charging current to the battery based on the result of its detection, and prohibiting means for prohibiting the power cutting-off means from cutting off the supply of the electric power from the external power source until the supply of the charging current to the battery is stopped by the overcharge preventing means.

According to the electronic equipment having the above-described construction, the power cutting-off means serves to cut off or stop the supply of the electric power from the battery when no data is input from the inputting means for the predetermined period of time. At this time, the prohibiting means prohibits the power cutting-off means from cutting off the supply of the electric power from the external power source until the overcharge preventing means detects whether the battery has been brought into an overcharged state thereby to cut off the supply of the charging current to the battery by the charging means based on the result of its detection.

As will be apparent from the above description, the electronic equipment of the present invention can prevent the battery from being overcharged. The electronic equipment is also simple in structure and can be manufactured at a low cost.

BRIEF DESCRIPTION OF THE DRAWINGS

The above and other objects, features and advantages of the present invention will become apparent from the following description and the appended claims, taken in conjunction with the accompanying drawings in which preferred embodiments of the present invention are shown by way of illustrative examples.

FIG. 3B is a chart corresponding to the steps of the flowchart of FIG. 3A;

FIG. 5B is a chart depicting the embodiment of FIG. 5A corresponding to the steps of the flow chart of FIG. 3A.

FIG. 6B is a chart depicting the embodiment of FIG. 6A corresponding to the steps of the flow chart of FIG. 3A.

DETAILED DESCRIPTION OF THE PREFERRED EMBODIMENTS

Figure 1:
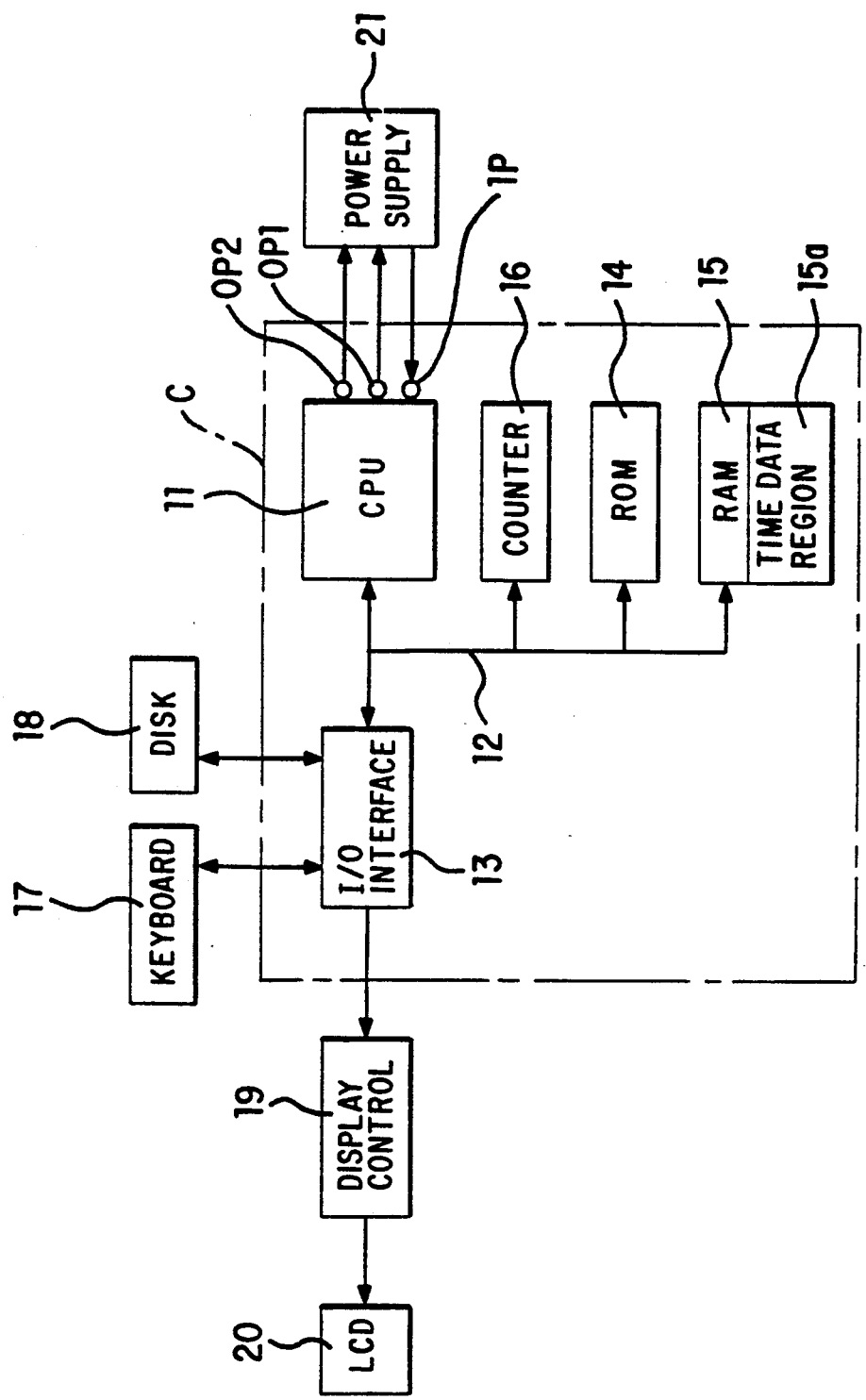
FIG. 1 is a block diagram showing an electric configuration of one embodiment.

The present invention is described with respect to a word processor having a time-display function. FIG. 1 is a block diagram showing an electric configuration of the word processor.

A control unit C of the word processor comprises a CPU 11, an input/output interface 13 electrically connected to the CPU 11 via a bus 12 such as a data bus, a ROM 14, a RAM 15, and a counting device 16 for providing a series of timing signals. The counting device 16 counts the number of clock pulses generated from a quartz oscillator incorporated therein so as to create time data per second, and conveys time data indicative of "time" and "minute" of the created time data to the bus 12.

Electrically connected to the input/output interface 13 are a keyboard 17 having a number of character keys and function keys, a floppy-disk system 18, a display controller 19, and a liquid crystal display 20 electrically connected to the input/output interface 13 via the display controller 19. The floppy disk system 18 reads programs or data recorded on a floppy disk and writes document data created by the word processor into the floppy disk.

The display controller 19 includes a display RAM for supplying display data to the liquid crystal display 20 and a character generator ROM for storing a number of dot patterns such as characters, symbols therein. In addition, the display controller 19 serves to display characters and symbols on the liquid crystal display 20 in the form of the dot patterns.

The ROM 14 stores therein a display control program for displaying characters and symbols or the like on the liquid crystal display 20 in association with code data input from the keyboard 17, a control program for controlling the floppy-disk system 18 to read data or the like from a floppy disk and write the data or the like into the floppy disk, and an automatic power-off control program for executing an automatic power-off function to be described later.

The RAM 15 temporarily stores therein character data input from the keyboard 17 and data produced while a desired document is being created, and stores created document data therein. The RAM 15 has a time data region 15a for storing predetermined time data therein.

The CPU 11 has an input port IP and first and second output ports OP1, OP2 which are electrically connected to an electric power supply 21.

Figure 2:
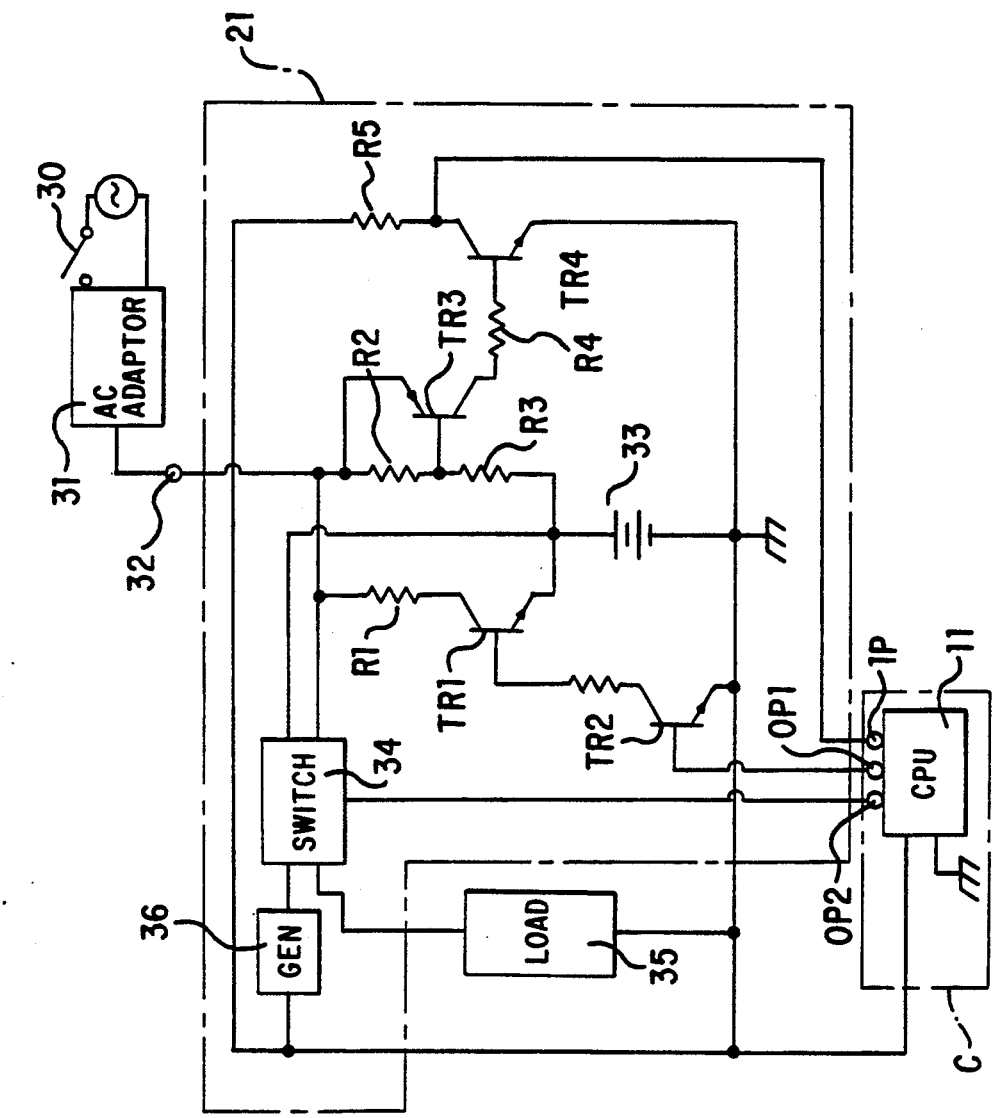
FIG. 2 is a block diagram illustrating the structure of an electric power supply employed in the embodiment of FIG. 1.

As shown in FIG. 2, the electric power supply 21 is provided with an adaptor connecting terminal 32 to which an AC adaptor 31 for generating a predetermined direct current voltage from a commercial power source is electrically connected, and a battery 33 capable of being charged by charging current. The battery 33 may be a lead battery, a nickel-cadmium (Ni-Cd) battery, a battery composed of silver oxide and zinc oxide or other conventional battery. In the present embodiment, a Ni-Cd battery is preferably used as the battery 33.

Positive electrodes of the adaptor connecting terminal 32 and the battery 33 are electrically connected via a switching device 34 to the positive electrode of a control unit C and the positive electrode of a load 35 including the floppy-disk system 18, the liquid crystal display 20, etc. The switching device 34 is electrically connected to the second output port OP2 of the CPU 11, and is turned on and off by operation of a power switch 30 by an operator or based on a signal generated from the CPU 11.

A low-voltage generator 36 is connected between the switching device 34 and the control unit C for converting a voltage generated from either the AC adaptor 31 or the battery 33 into a low voltage of about 5 volts.

The adaptor connecting terminal 32 is electrically connected to a collector terminal of a transistor TR1 via a resistor R1. An emitter terminal of the transistor TR1 is electrically connected to the positive electrode of the battery 33. In addition, the AC adaptor 31 is electrically connected to the adaptor connecting terminal 32. When the transistor TR1 is in an on-state, a charging current flows into the battery 33.

A base terminal of the transistor TR1 is electrically connected via a resistor to a collector terminal of a transistor TR2. A base terminal of the transistor TR2 is electrically connected to the first output port OP1 of the CPU 11. The CPU 11 is activated to cause the transistor TR2 to turn on and off the transistor TR1.

The adaptor connecting terminal 32 is also electrically connected to the positive electrode of the battery 33 via two series-connected resistors R2, R3. Resistor R3 has a very high resistance. A base terminal of a transistor TR3 is electrically connected between the two resistors R2 and R3, whereas an emitter terminal of the transistor TR3 is electrically connected to one end of the resistor R2 on the adaptor connecting terminal 32 side. In addition, a collector terminal of the transistor TR3 is electrically connected via a resistor R4 to a base terminal of a transistor TR4. A collector terminal of the transistor TR4 is electrically connected to an output terminal of the low-voltage generator 36 through a resistor R5. The collector terminal of the transistor TR4 is also electrically coupled to the input port IP of the CPU 11.

When the AC adaptor 31 is connected to the adaptor connecting terminal 32, the transistor TR4 is turned on to change the input port IP from a high level to a low level. Thus, it is detected that the AC adaptor 31 has been connected to the adaptor connecting terminal 32.

Incidentally, the negative electrodes of the control unit C, the load 35 and the battery 33, and the emitter terminals of the transistors TR2, TR4 are respectively connected to ground.

The operation of the present embodiment constructed as described above will now be described below with reference to FIG. 2.

Figure 3A:
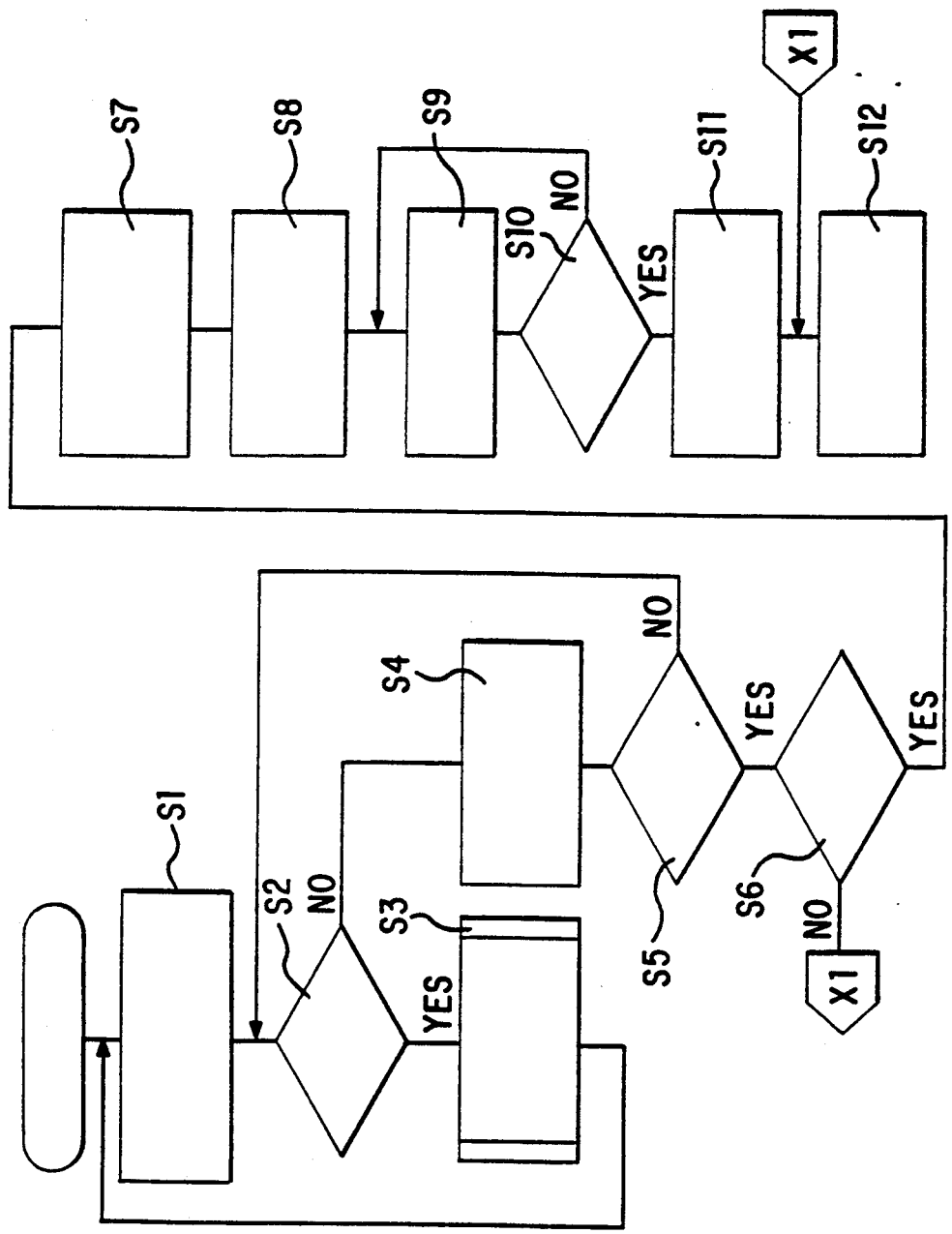
FIG. 3A is a flowchart for describing the operation of the embodiment of FIG. 1.

When the operator turns on the power switch 30, the switching device 34 is turned on. Thus, when the AC adaptor 31 is electrically connected to the adaptor connecting terminal 32, electric power is supplied to either the control unit C and the load 35 from the AC adaptor 31. On the other hand, when the AC adaptor 31 is disconnected from the adaptor connecting terminal 32, the electric power is supplied to either the control unit C and the load 35 from the battery 33. Then, the CPU 11 initializes, i.e., clears the RAM 15, for example. Alternatively, the CPU 11 outputs a signal from the output port OP1 so as to turn off the transistor TR1 and then executes an automatic power-off control program shown in FIG. 3.

The term "automatic power-off" represents a process executed in such a manner that when no input is given by the keyboard 17 for a predetermined period of time, the switching device is turned off to cut off or stop the supply of electric power to the control unit C and the load 35 to consume less power from the battery 33, thereby enabling the battery to be used for a long period of time.

When the automatic power-off control program is executed, the CPU 11 receives time data from the counting device 16 to determine time data TS1 indicative of the time elapsed, 10 minutes for example, from the time indicated by the time data received therefrom so as to store the determined time data TS1 in the time data region 15a of the RAM 15 (S1). Then, the CPU waits for information to be entered via keys on the keyboard 17 (S2).

When the operator enters information via the keyboard 17 (S2: YES), processes, such as a process for inputting characters and a process for driving the floppy-disk system 18, are executed by keys on the keyboards by the operator (S3). When these processes are finished, S1 is executed again.

When the information is not entered via the keys in S2 (S2: NO), the CPU 11 receives time data T indicative of the present time from the counting device 16 (S4). Then, the CPU 11 determines whether or not the time data T exceeds or is in advance of the time data TS1 stored in the time data region 15a (S5). If the answer is determined to be negative (S5: NO), the routine procedure is returned to S2, and the CPU waits for information entered via the keys on the keyboard 17.

If the answer is determined to be positive in S5 (S5: YES), the CPU 11 determines whether or not a signal input to the input port IP of the CPU 11 is low in level when information has not been entered via the keys for ten minutes or longer (S6).

When the AC adaptor 31 is disconnected from the adaptor connecting terminal 32, a current does not flow into the base terminal of the transistor TR3. Therefore, no current flows into the base terminal of the transistor TR4 so that the transistor TR4 is brought into an off state. Accordingly, the signal input into the input port IP is rendered high in level, so that the answer in S6 is of "NO", thus allowing execution of the automatic power-off in S12 to be described later.

On the other hand, when the AC adaptor 31 is connected to the adaptor connecting terminal 32, the current flows into the base terminals of the transistors TR3, TR4 so as to turn on the transistor TR4. Accordingly, the signal applied to the input port IP is kept low in level, so that the answer in S6 is affirmative. Therefore, the routine procedure proceeds to S7 where a program is executed.

In S7, the CPU 11 receives time data indicative of the present time from the counting device 16 or calculates or determines time data TS2 indicative of time when six hours, for example, have elapsed, the time being used to bring the battery into a fully charged state, based on the time data TS1 stored in the time data region 15 a. Then, the CPU 11 stores the determined time data TS2 in the time data region 15a.

Then, the CPU 11 outputs a signal from the output port OP1 to cause the transistor TR2 to change the transistor TR1 from an off-state to an on-state, thereby causing a charging current to flow into the battery 33 from the AC adaptor 31 (S8). At the same time, the CPU 11 serves to display on the liquid crystal display 20, a message indicative of the fact that the battery 33 is being charged.

Then, the CPU 11 receives time data T indicative of the present time from the counting device 16 (S9), and determines whether or not the time data T exceeds, i.e., is in advance of, the time data TS2 stored in the time data region 15a (S10). If six hours, for example, have not elapsed since the message has been displayed on the liquid crystal display 20 (S10: NO), S9 and S10 are executed. When six hours have elapsed (S10: YES), the CPU 11 determines that the battery 33 has been fully charged. Then, the CPU 11 outputs a signal from the output port OP1 to cause the transistor TR2 to change the transistor TR1 from the on-state to the off-state, thereby preventing a charging current from flowing into the battery 33 (S11). As a result, the battery 33 can be prevented from being brought into an overcharged state for a long period of time. However, the battery 33 remains electrically connected to the AC adaptor 31 via resistors R2 and R3. Since the resistor R3 has a very high resistance, only a trickle charge passes to the battery 33, which maintains the charge in the battery 33 but does not cause an overcharge to accumulate.

After S11 has been executed, the CPU 11 outputs a signal from the output port OP2 to turn off the switching device 34 so as to cut off the supply of the electric power to the control unit C and the load 35 (S12). That is, the automatic power-off is executed.

According to the word processor of the present embodiment, as has been described above, when no information is entered via the keys for ten minutes or longer in a state in which the AC adaptor 31 is not electrically connected to the adaptor terminal 32, the automatic power-off is executed. Accordingly, the word processor can be supplied with power by a battery over a long period of time. Furthermore, when no information is entered via the keys for ten minutes or longer in a state in which the AC adaptor 31 is electrically connected to the adaptor connecting terminal 32, the transistor TR1 is turned on to cause a charging current to flow into the battery 33, to thereby start charging the battery 33. After the battery 33 has been fully charged, i.e., six hours has elapsed, the transistor TR1 is turned off to cut off or stop the supply of the charging current to the battery 33. As a result, the battery 33 can be prevented from being overcharged over a long period of time, thereby making it possible to prevent the battery 33 from producing heat and deteriorating in performance.

The present invention is not necessarily limited to the above embodiment. It will be apparent to those skilled in the art that many changes and modifications can be made without departing from the spirit or scope of the invention as set forth herein.

Figure 4:
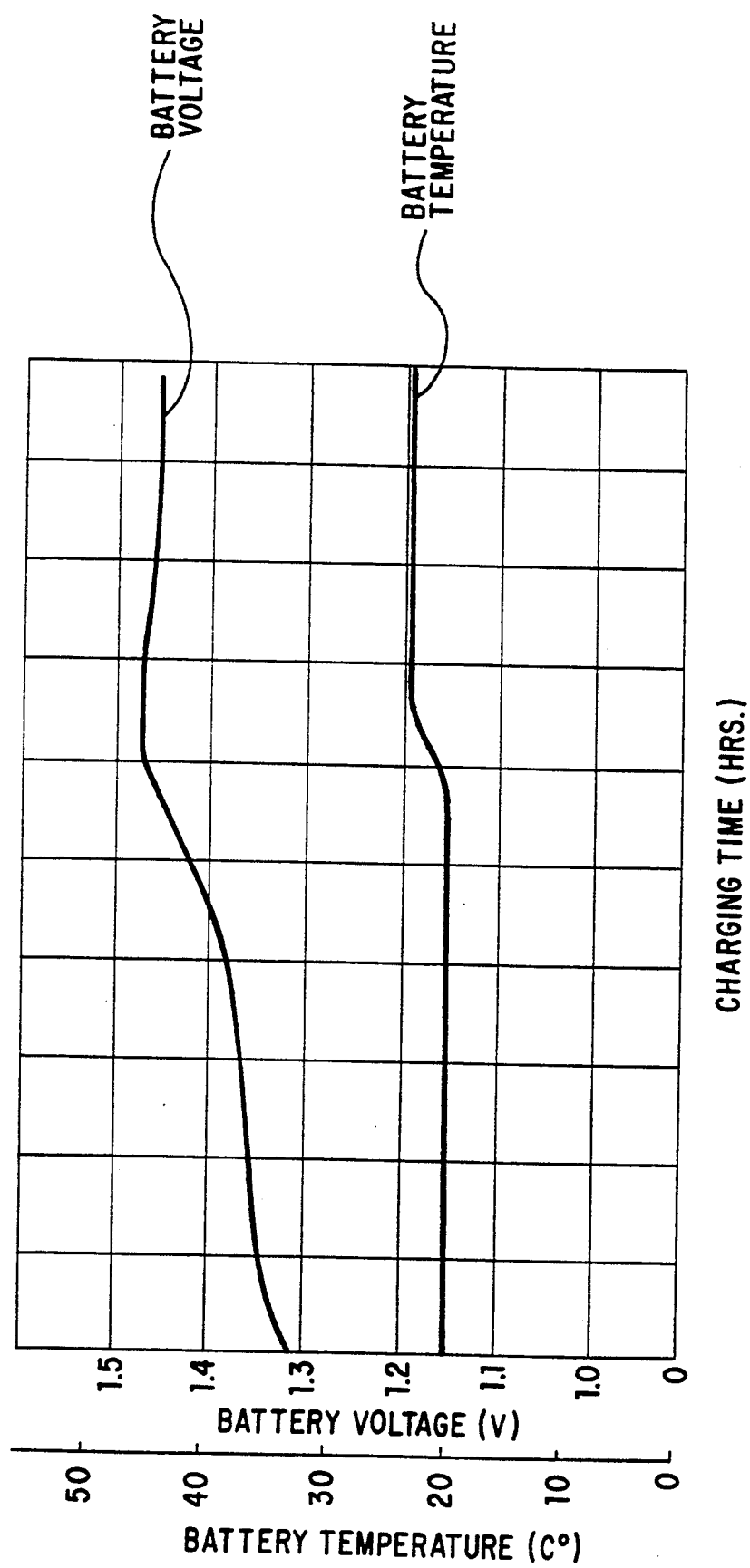
FIG. 4 is a graph for describing characteristic curves showing the relationship between battery temperature and charging time.
Figure 5A:
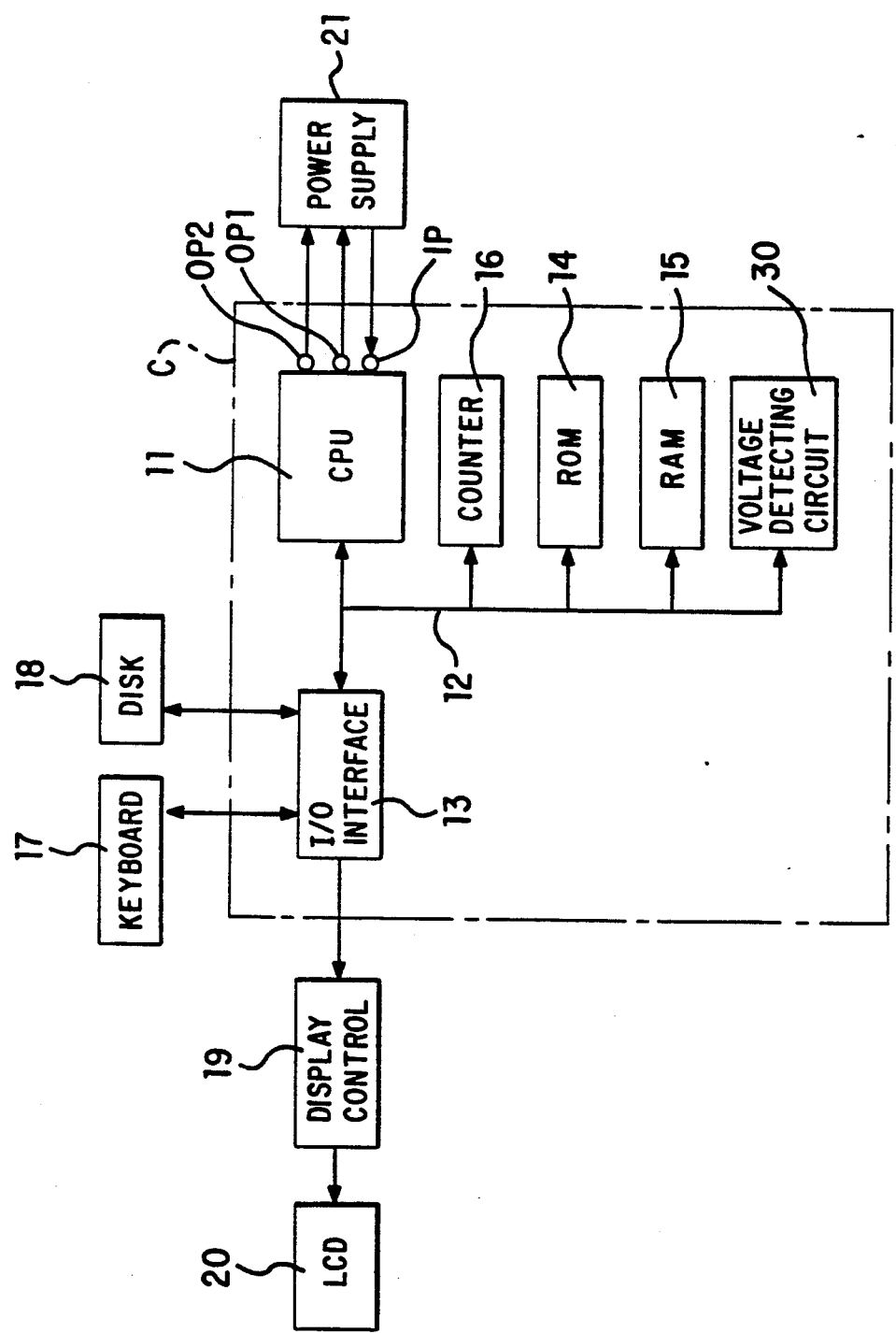
FIG. 5A is a block diagram showing an electric configuration of another embodiment.

In the Ni-Cd battery which has been used as the battery in the present embodiment, as shown in FIG. 4, the voltage of the Ni-Cd battery reaches a maximum value when the Ni-Cd battery has been fully charged, whereas it reaches a given value lower than the maximum value when the Ni-Cd battery has been brought into an overcharged state. In the present embodiment, the charging current is cut off after six hours has elapsed since the charging of the battery was initiated. However, as shown in FIGS. 5A and 5B, a voltage detecting circuit 30 for detecting the voltage of the battery may be provided to cut off the charging current when the voltage of the Ni-Cd battery has reached the maximum value. Alternatively, when the battery changes from the fully charged state to the overcharged state, the voltage detecting circuit 30 may be activated to detect that the voltage of the Ni-Cd battery has changed from the maximum value to a low value so as to cut off the charging current based on the result of its detection. As shown in FIG. 5B, which corresponds to the flow chart of FIG. 3A, the CPU 11 determines voltage data VFC based on time data TS1 stored in the time data region 15a. CPU 11 stores voltage data VFC, which is indicative of the maximum voltage level in the battery. Then, CPU 11 outputs a signal to cause transistor TR2 to charge transistor TR1 from an off-state to an on state, thereby causing a charging current to flow into the battery 33. The CPU 11 continuously receives input voltage data V, indicative of the present level of voltage in the battery, from the voltage detecting circuit 30 and compares the value V with the maximum voltage level VFC. If CPU 11 detects that the voltage level V has changed from the maximum voltage level VFC to a low value as shown in FIG. 4, CPU 11 determines that battery 33 is fully charged. Then, the CPU 11 outputs a signal from the output port OP1 to cause the transistor TR2 to change the transistor TR1 from the on-state to the off-state, thereby preventing a charging current from flowing into the battery 33. Then, the CPU 11 outputs a signal from the output port OP2 to turn off the switching device 33 so as to cut off the supply of the electric power to the control unit C and the load 35. That is, the automatic power off is executed.

Figure 6A:
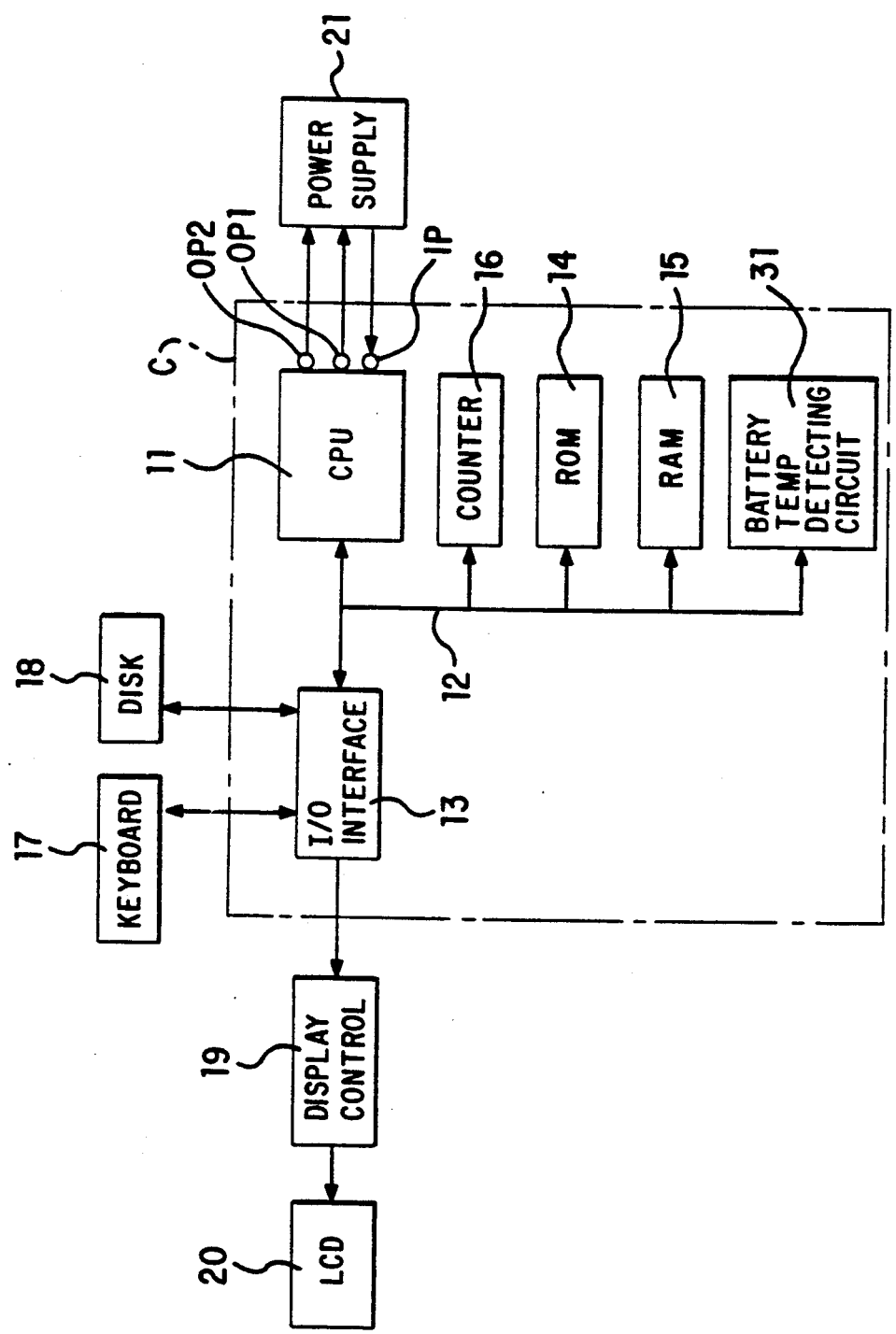
FIG. 6A is a block diagram showing an electric configuration of another embodiment.

When the Ni-Cd battery changes from the fully charged state to the overcharged state, the temperature of the Ni-Cd battery becomes higher than the previous temperature as shown in FIG. 4. Therefore, in the embodiment shown in FIGS. 6A and 6B, a battery-temperature detecting circuit 31 is provided to detect the temperature of the secondary battery. After completion of its detection, a charging current may be cut off when the temperature of the battery increases. As shown in FIG. 6B, which corresponds to the flow chart of FIG. 3A, CPU 11 determines a temperature data value TFC based on time data TS1 stored in the time region 15a. CPU 11 stores temperature data TFC, which is indicative of the temperature of the battery when the battery is fully charged. As described above, the CPU 11 outputs the signal to cause a charging current to flow into the battery 33. The CPU receives temperature data T, indicative of the present temperature of the battery, from the battery-temperature detecting circuit 31. If the present temperature T of the battery is higher than the temperature value TFC as shown in FIG. 4, CPU 11 determines that battery 33 is fully charged. CPU 11 then causes the charging current to stop flowing into the battery 33 and the automatic power off is executed as described above.

What is claimed is:

1. Electronic equipment for connection to an external power source having a battery and inputting means for inputting data, said electronic equipment comprising:
control means electrically coupled to the external power source for controlling a supply of electric power from the external power source to said battery and to said electronic equipment, including, power cutting-off means for cutting off a supply of electric power from the battery when no data is entered by the inputting means for a given period of time and for selectively cutting off a supply of electric power from the external power source to the control means
charging means for charging the battery with a supply of power from the external power source;
overcharge preventing means for detecting whether the battery has been overcharged and for preventing said charging means from charging the battery when overcharge of the battery has been detected; and
prohibiting means for prohibiting the power cutting-off means from cutting off the supply of electric power to the control means until the charging means is prevented from charging the battery by said overcharge preventing means.

2. Electronic equipment as claimed in claim 1, wherein said overcharge preventing means prevents a supply of charging current to the battery when the battery is charged by said charging means beyond a predetermined time.

3. Electronic equipment as claimed in claim 1, wherein said overcharge preventing means comprises battery voltage detecting means for detecting a voltage of the battery, wherein said overcharge preventing means prevents a supply of charging current to the battery when said battery voltage detecting means detects that the voltage of the battery reaches a predetermined level.

4. Electronic equipment as claimed in claim 1, wherein said overcharge preventing means comprises battery temperature detecting means for detecting a temperature of the secondary battery, wherein said overcharge preventing means prevents a supply of charging current to the secondary battery when said battery temperature detecting means detects that a temperature of the secondary battery reaches a predetermined level.

5. Electronic equipment for connection to an external power source having a battery for supplying electric power thereto comprising:
inputting means for inputting data;
determining means for determining whether data has been entered by the inputting means within a given period of time;
switching means for cutting off the supply of electric power from the battery and the external power source to the electronic equipment;
recharging means for recharging the battery;
overcharge preventing means for preventing a supply of charging current to the battery to prevent said recharging means from recharging the battery when the battery is fully charged; and
control means powered by the external power source for operating said switching means to cut off the supply electric power from the battery when the determining means determines that data has not been entered by inputting means for a given period of time and cutting off power to said battery and said control means from the external power source when said overcharge preventing means has prevented a supply of charging current to the battery.

6. Electronic equipment as claimed in claim 5, wherein said recharging means comprises an adaptor terminal capable of connecting an adaptor for generating a predetermined direct current voltage from a commercial power source.

7. Electronic equipment as claimed in claim 6, further comprising adaptor determining means for determining whether the adaptor is connected to said adaptor terminal, wherein said recharging means recharges the battery when said determining means determines that said adaptor is connected to said adaptor terminal 8. Electronic equipment as claimed in claim 7, wherein said switching means cuts off a supply of electric power from the battery to the electronic equipment when said determining means determines that data has not been entered by said input means during said given time period and when said adaptor determining means determines that said adaptor is not connected to said adaptor terminal.

9. Electronic equipment as claimed in claim 5, further comprising a display supplied with electric power through said switching means.

10. Electronic equipment for connection to an external power source and having a battery for supplying electric power thereto comprising:
- a keyboard for inputting data;
- a display for displaying data inputted by said keyboard, said display being supplied with electric power from the battery;
- a timer for measuring a first time and a second time;
- a recharging circuit for recharging said battery, said second time being predetermined for sufficiently recharging the battery through said recharging circuit;
- a switching circuit for selectively cutting off a supply of electric power from the battery and the external power source;
- a cut-off circuit for cutting off a supply of charging current to the battery;
- recharging control means for starting said recharging circuit to recharge the battery when no data from said keyboard is inputted during the first time measured by said timer and for starting said cut-off circuit to cut off a supply of charging current from the external power source to the battery so that said recharging circuit is prevented from overcharging the battery when said timer measures said second time; and
- cutting control means for starting said switching circuit to cut off the supply of electric power from the external power source after said cut-off circuit has cut off a supply of charging current to the battery.

11. A power supply assembly for electronic equipment connected to a power source and a controller, comprising:
- an AC adaptor for generating DC from a power source;
- a battery electrically connected to the adaptor;
- a switching device electrically connected between the adaptor and the electronic equipment and between the battery and the electronic equipment, the switching device adapted to receive a signal from the controller for cutting off current from the battery to the electronic equipment after a first time period and for cutting off current from the adaptor to the controller after a second time period; and
- a first transistor electrically connected to the adaptor and the battery adapted to receive a signal from the controller for cutting off current from the adaptor to the battery after the second time period.

12. A power supply assembly of claim 11, further comprising a low voltage generator electrically coupled between the switching device and the electronic equipment.

13. A power supply assembly of claim 11, further comprising a second transistor electrically coupled between the first transistor and the controller for controlling flow of current through the first transistor.

14. A power supply assembly of claim 11, further comprising at least one resistor electrically coupled between the adaptor and the battery.

15. A power supply assembly of claim 11, further comprising an information circuit coupled between the adaptor and the controller for providing signals to the controller about the current from the adaptor for generating the signal to the switching device, said information circuit including a resistor electrically coupled between the switching device and the controller, and a third transistor electrically coupled between the adaptor and ground.

16. A power supply assembly of claim 11, wherein the controller comprises a counter for counting an input time corresponding to the first time period based on external input to the electronic equipment, the input time controlling the signal to the switching device for controlling the current from the battery to the electronic equipment.

17. A power supply assembly of claim 16, wherein the controller comprises a counter for counting a charging time corresponding to the second time period based on the time required to charge the battery, the charging time controlling the signal to the first transistor for controlling the current from the adaptor to the battery.

18. A power supply assembly of claim 11, wherein the controller comprises a counter for counting a charging time corresponding to the second time period based on the time required to charge the battery, the charging time controlling the signal to the first transistor for controlling the current from the adaptor to the battery.

19. A power supply assembly of claim 11, further comprising a voltage detecting circuit for detecting voltage of the battery, the detected voltage controlling the signal to the first transistor for controlling the current from the adaptor to the battery.

20. A power·supply assembly of claim 11, further comprising a temperature detecting circuit for detecting temperature of the battery, the detected temperature controlling the signal to the first transistor for controlling the current from the adaptor to the battery.

21. Electronic equipment adapted for connection to an external power source, comprising:
- electronic components electrically coupled to the external power source;
- a battery electrically coupled to said electronic components and the external power source, capable of being charged from the external power source; and
- control means electrically coupled to the external power source for controlling a supply of electronic power from the external power source to said battery and to said electronic components, including,
- charging means for selectively supplying said battery with electric power from the external power source,
- detecting means for detecting overcharge of said battery, said charging means being responsive to said detecting means for cutting off the power supply to said battery,
- cutting-off means for selectively cutting off the supply of electric power from the external power source to the control means after a period of time of no data entry to the electronic equipment, and
- prohibiting means for prohibiting said cutting-off means from cutting off the supply of electric power from the external power source until overcharge of said battery has been detected.

22. Electronic equipment as in claim 21, wherein said detecting means comprises a timer means for counting a charging time required to charge said battery.

23. Electronic equipment as in claim 21, wherein said detecting means comprises a voltage detecting means for detecting voltage of said battery.

24. Electronic equipment as in claim 21, wherein said detecting means comprises a temperature detecting means for detecting temperature of said battery.

* * * * *